Nov. 25, 1924.
I C EMERY
METHOD OF MAKING NUTS.
Filed Dec. 5, 1922
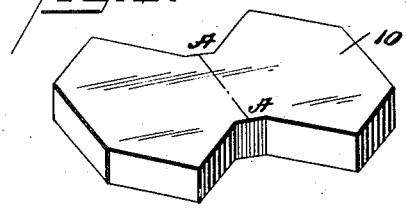
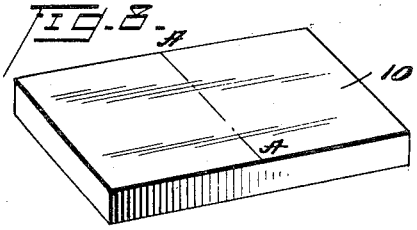
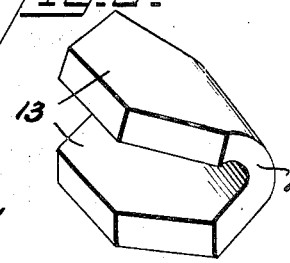
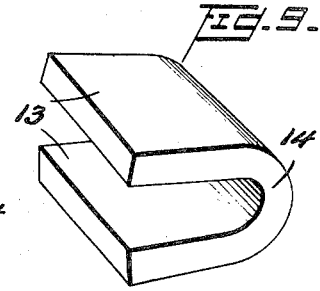
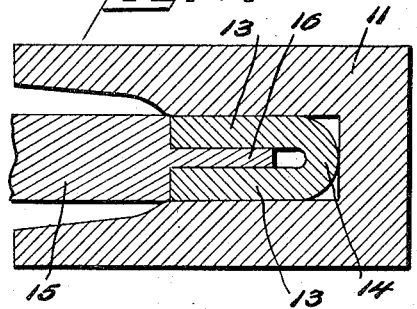
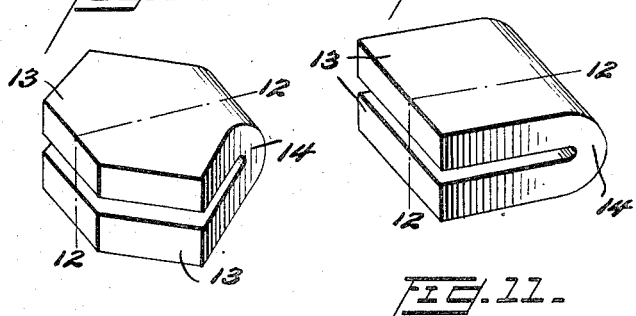
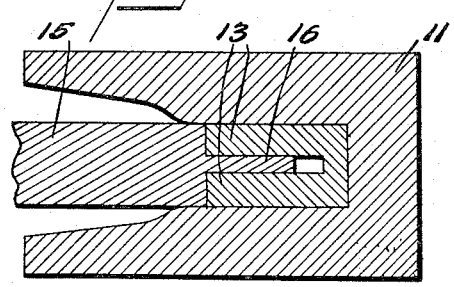
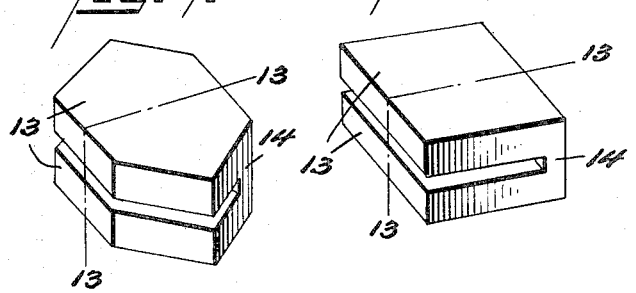
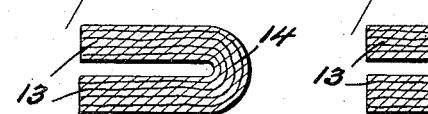
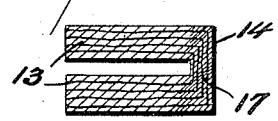
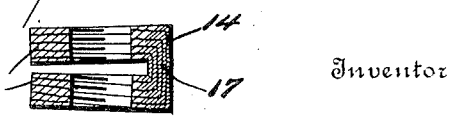
Inventor
J C Emery,
By Watson, Coit, Morse & Grindle
Attorney Patented Nov. 25, 1924.

1,516,721

UNITED STATES PATENT OFFICE.

I C EMERY, OF BALTIMORE, MARYLAND, ASSIGNOR TO CHAPMAN SELF-LOCKING NUT CO., TRUSTEE, OF BALTIMORE, MARYLAND.

METHOD OF MAKING NUTS.

Application filed December 5, 1922. Serial No. 605,119.

*To all whom it may concern:*

Be it known that I, I C EMERY, a citizen of the United States, and resident of Baltimore city, State of Maryland, have invented certain new and useful Improvements in Methods of Making Nuts, of which the following is a specification.

My invention relates to lock nuts of the type in which a blank is bent to form superposed wings with a neck of metal joining the wings and to a process of making such nuts.

In making nuts of this kind after the wings are bent into superposed position they are pierced and threaded and one or both of the wings is displaced relative to the other wing to throw the threaded openings in the two wings out of alignment so that when a bolt is threaded thereinto it will jam or bind in the distorted thread passage. Heretofore lock nuts of this type have not proved satisfactory. The principal difficulties have been due to the fact that the neck of metal joining the two wings is apt to crack or break thus rendering the nut inoperative and furthermore after the nut has remained in position for some time on a bolt or after it has been removed and replaced a few times the metal of the neck loses its resiliency with the result that the nut no longer binds on the bolt and will not remain in fixed position thereon.

It is the object of my invention to provide an improved nut of the type referred to which overcomes these difficulties and to provide an improved process for making such nuts.

My improved nut and the process of making the same are set forth in the following specification and illustrated in the accompanying drawings in which:

Figure 1 shows a blank used in making a hexagonal nut;

Figure 2 illustrates the first step in bending the blank in suitable dies to form the nut;

Figure 3 shows the blank after such bending operation;

Figure 4 shows a further step in bending the blank;

Figure 5 shows the blank after such further bending operation;

Figure 6 illustrates the final steps in shaping the nut;

Figure 7 shows the nut in its final stage before it is pierced and threaded;

Figures 8, 9, 10 and 11 correspond respectively to Figure 1, 3, 5 and 7 and illustrate the same steps applied in the manufacture of a rectangular nut;

Figure 12 is a section on the line 12—12 of Figure 5 or 12—12 of Figure 10 showing particularly the direction in which the grain of the metal extends through the blanks;

Figure 13 is a sectional view on the line 13—13 of Figure 7 or 13—13 of Figure 11 showing particularly the densification and improved structure of the metal in and adjacent to the neck of the blank which results from compressing the blank as hereinafter described; and Figure 14 is a central section through a finished nut either of the hexagonal or rectangular type showing the two wings slightly displaced toward each other.

According to my invention I first produce a blank 10 which may be of a form to produce a hexagonal nut as shown in Figure 1, or of any other desired form, such for example, as that shown in Figure 8 which will produce a rectangular nut. In forming the blanks the material is preferably so cut that the grain of the metal will extend lengthwise of the blank, the grain preferably extending from one end entirely to the other end of the blank. After the blank is produced it is bent on a line extending from one side to the other of the blank and across the grain of the metal, this line of bend being illustrated in dotted lines at A in Figures 1 and 8. This bending operation may be performed in any suitable manner, preferably by means of a die into which the blank is forced as by means of a bending punch 12. The form produced by thus bending the blank is illustrated in Figures 3 or 9 and comprises superposed wings 13, 13 joined by a neck of metal indicated at 14. The blank is then further flattened into the form illustrated in Figures 5 or 10 in which the superposed wings 13, 13, are spaced a slight distance from each other. This further flattening of the blank is preferably accomplished by forcing the same into the bottom portion of the die 11 by means of a punch or plunger 15 provided on its front end with a thin blade or spacer 16 which is adapted to enter between the wings 13 of the nut and thus properly space the same. The next step in making the finished nut consists in compressing the form illustrated in Figures 5 or 10 and particularly in compressing and densifying the metal forming the neck 14. This is accomplished by applying heavy pressure to the plunger 15 and forcing the same further into the die 11, it being understood that the inner walls of the die and the end of the plunger are shaped to correspond with the particular shape of nut to be produced. When the plunger is thus forced further into the die, the metal of the nut blank will be caused to flow into the recesses of the die so that the neck 14 will be squared up to correspond to the other sides of the nut and the metal of the neck will thus be compressed and densified and improved in structure. The compressed and densified structure of the metal in and adjacent to the neck is illustrated at 17 in Figures 13 and 14. This compressing of the nut blank in the die also serves to true up all the edges and parts of the nut. During such final compression of the blank in the die, the spacer 16 on the plunger maintains the wings 13 thereof separated. After the final operation of shaping and compressing the blank is completed, it is ejected from the die by any suitable mechanism not shown. In practice, it may of course be found desirable to carry out several of the foregoing steps simultaneously thereby reducing the number of dies necessary and the time required. The nut as finally produced by the foregoing operations is illustrated in Figures 7 and 11. The wings 13 are then pierced to provide a suitable bore which is threaded in any suitable manner. As a final step the wings 13, 13 of the nut are slightly displaced relative to each other preferably the outer or free ends of these wings being bent slightly toward each other as illustrated in Figure 14, which causes the bores in the wings 13, 13 to be thrown slightly out of alignment. The result is that when the nut is threaded on a bolt the wings 13, 13 will be spread apart to bring the bores thereof in line but due to the resiliency of the metal in the neck 14 the wings 13, 13 will bind on the bolt and thus securely lock the same against turning on account of vibration or shock but permit the same to be rotated in either direction on the bolt by application of sufficient force thereto as by means of a wrench.

As heretofore stated and as illustrated particularly in Figures 12 and 13, the grain of the metal in the finished nut preferably extends from the outer end of each of the wings 13, 13 toward the neck 14 and then across this neck substantially at right angles to the line on which the blank forming the nut has been bent. The result is that the bending of the blank to form the nut will not crack or break the metal as is the case where the grain of the metal extends in the direction of the bend in the blank. With the grain of the metal running as described it has been found that the nuts will retain their resiliency for a long time and even where the nuts are frequently removed from and replaced on a bolt little or no tendency exists for the metal of the neck to break or lose its resiliency as in prior constructions.

Furthermore, by working and densifying the metal of the neck 14 as heretofore described, the nuts are rendered still more efficient. Such working of the metal improves its structure and renders it more resilient so that the nuts retain for an almost indefinite period their distorted condition, as shown in Figure 14, so that they continue to bind on a bolt even after they have been in position for a long time, and this increased resiliency and strength of metal in the neck renders it possible for the nuts to be repeatedly put on and taken off of a bolt without in any way effecting their efficiency as a lock nut.

It will thus be seen that I have provided a lock nut and a method of making the same which obviates to a large extent the difficulties heretofore experienced with nuts of this character and extended practical use of nuts produced by my method herein described has shown that they are highly efficient and successful and satisfactorily perform the function for which they are intended.

It is obvious that the details of structure and procedure herein described may be varied without departing from the spirit of the invention, and therefore I do not wish to be limited to such details except as may be required by the claims.

Having thus described my invention what I claim as new and desire to secure by Letters Patent is:

1. In the process of making lock nuts, the steps of bending a blank into superposed wings joined by a neck of metal, interposing a spacing device between said wings, and then compressing and densifying the metal forming said neck.

2. In the process of making lock nuts from a blank having superposed wings joined by a neck of metal, the steps which consist in confining said blank in a die and applying pressure thereto to compress and densify the metal forming the neck thereof.

3. In the process of making lock nuts, the steps of bending a blank along a line extending transversely of the grain of the metal into a form having superposed wings joined by a neck of metal, whereby the grain of the metal extends from one of said wings across the neck to the other wing, and then working the metal of the neck to densify and improve the structure of the same.

4. The process of making lock nuts comprising forming a metal blank with the grain of the metal extending from one end toward the other of the blank, bending the blank on a line extending across the grain of the metal to produce a form having superposed wings joined by a neck of metal, flattening said form to the thickness required in the finished nut, working the metal of said neck to densify and improve the structure of the same, piercing said nut to form the required bore, threading said bore, and slightly displacing one of said wings relative to the other.

5. In the process of making lock nuts from a blank having superposed wings joined by a neck of metal, the steps which consist in confining said blank in a die, applying pressure to the neck of the blank to square up the same and compress and densify the metal thereof, and maintaining said wings spaced apart during such compressing operation.

6. In the process of making lock nuts, the step of bending a blank into a form having superposed wings joined by a neck of metal, applying pressure to said blank in a die to densify and square up said neck and to simultaneously shape all parts of the nut to conform to the die.

In testimony whereof I hereunto affix my signature.

I C EMERY.